UNITED STATES PATENT OFFICE.

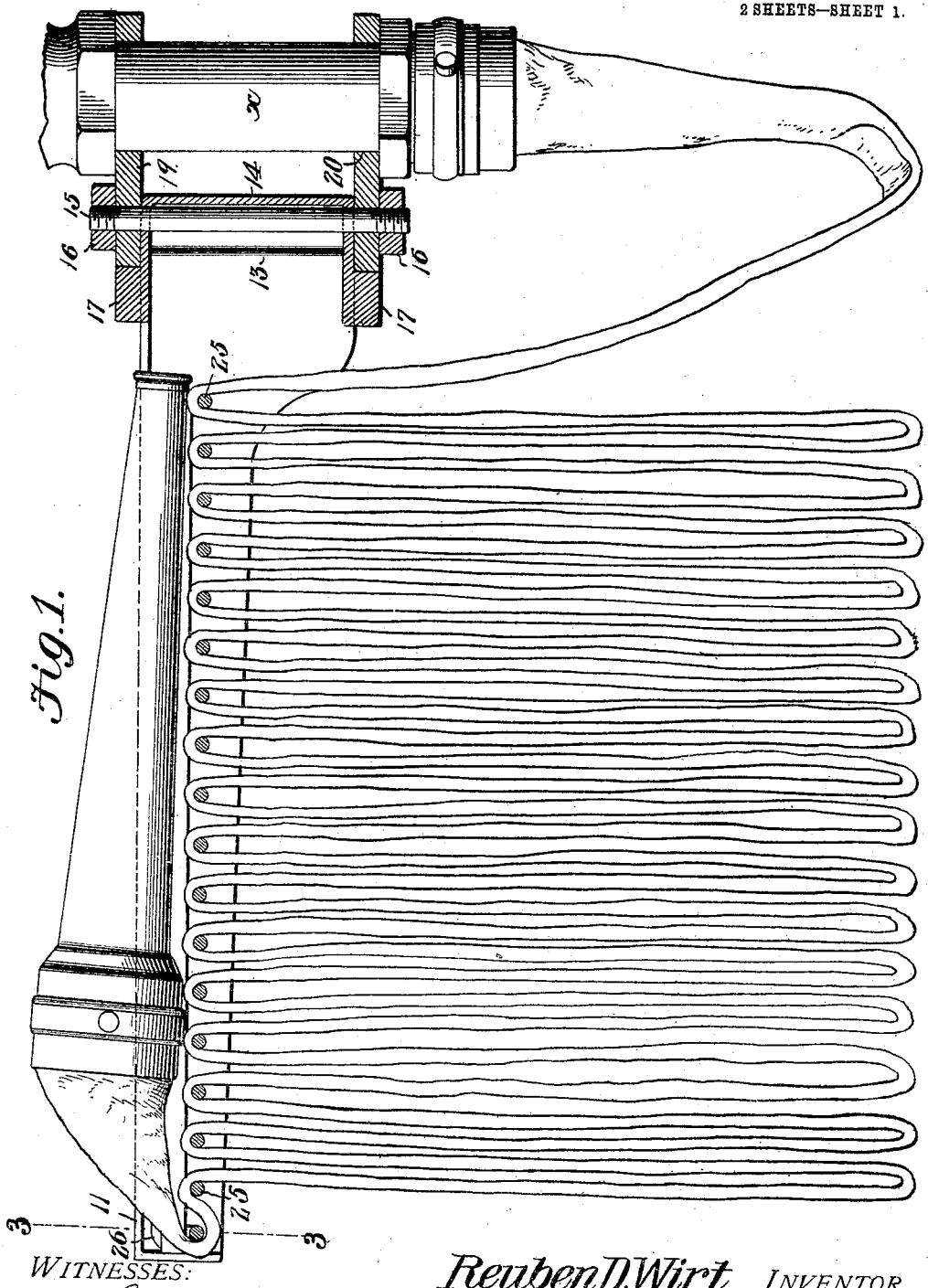

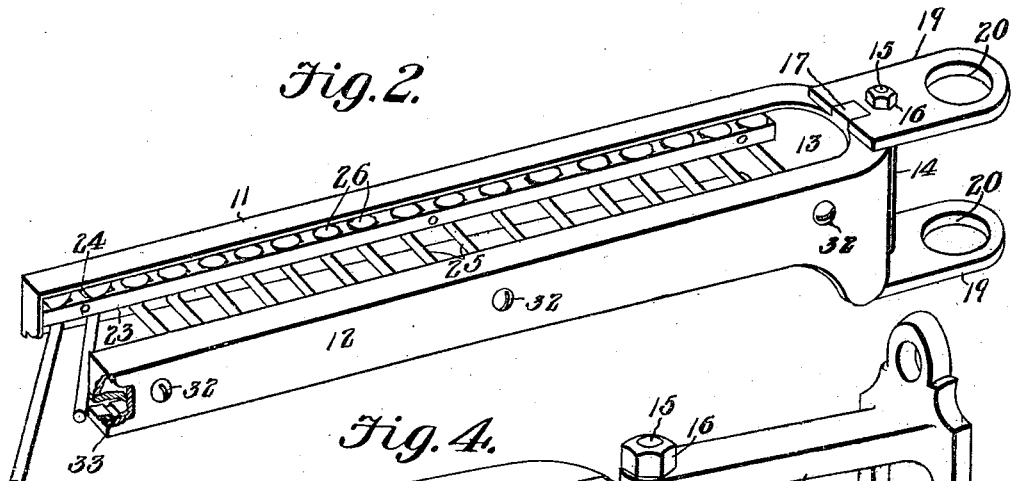
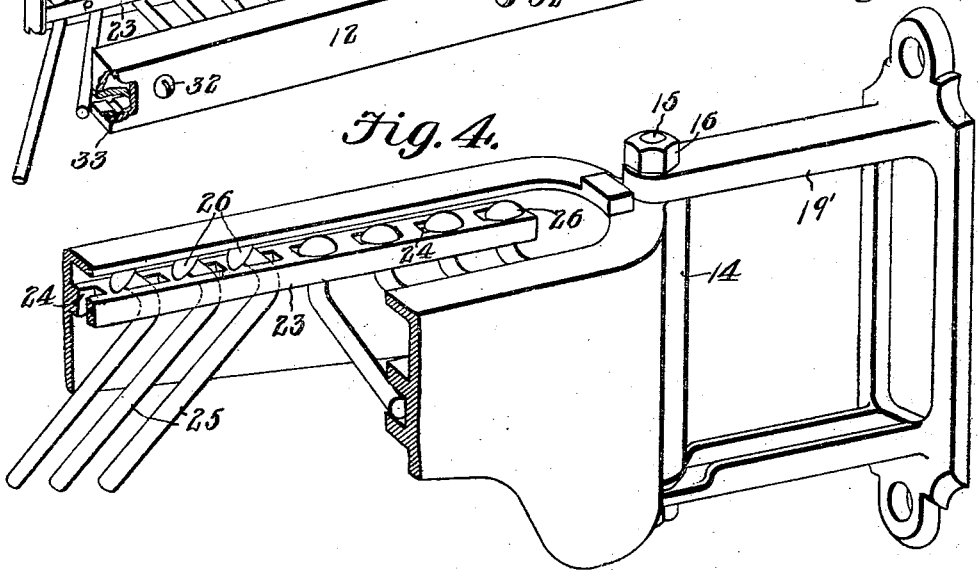
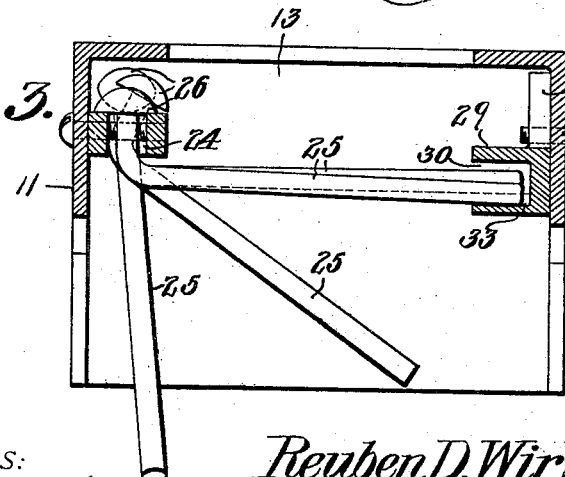

REUBEN D. WIRT, OF PHILADELPHIA, PENNSYLVANIA.

HOSE-RACK.

No. 856,326.  Specification of Letters Patent.  Patented June 11, 1907.

Application filed November 29, 1905. Serial No. 289,676.

*To all whom it may concern:*

Be it known that I, REUBEN D. WIRT, a citizen of the United States, residing at Philadelphia, in the county of Philadelphia and State of Pennsylvania, have invented a new and useful Hose-Rack, of which the following is a specification.

This invention relates to hose racks of that general type employed in buildings at points adjacent to a stand pipe.

The principal object of the invention is to provide a supporting rack from which the hose may be quickly released, and which will offer little or no resistance to the removal of the hose.

A further object of the invention is to provide a device of this type in which the hose is supported on a plurality of pins so arranged that while capable of movement to permit freeing of the hose, they will still remain attached to a fixed support in position to permit the ready adjustment of the hose after the fire is extinguished.

A still further object of the invention is to provide a hose rack in which a plurality of hose supporting pins are swiveled at one end to a fixed support, and have their opposite ends disposed within a groove formed in a second support, said pins being so arranged that during the removal of the hose from the rack they will turn through an arc of about ninety degrees in a horizontal plane, and will, also, fall, forming inclined guides down which the hose may slide between the two fixed supports.

A still further object of the invention is to provide a hose rack of such construction that it may be readily applied to brackets of different character; for instance, wall brackets or pipe brackets, without change in the construction of the rack.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a longitudinal sectional elevation of a hose rack constructed in accordance with the invention, showing the same supported by a pipe bracket. Fig. 2 is a detail perspective view of the hose rack and pipe bracket, a portion of one end of the rack being broken away in order to more clearly illustrate the construction. Fig. 3 is a transverse sectional view of the rack on the line 3—3 of Fig. 1. Fig. 4 is a detail perspective view of a portion of the rack showing the same carried by a wall bracket. Fig. 5 is a detail perspective view of a slight modification of the invention.

Similar numerals of reference are employed to indicate corresponding parts throughout the several figures of the drawings.

The main frame of the hose rack is substantially U-shaped, including two parallel arms 11—12, connected at the rear or inner end by a curved portion 13, while the opposite ends of the arm are spaced to permit the ready introduction and withdrawal of the hose. Each of the arms 11—12 is provided with a vertical flange which greatly increases in height from the outer end, and at the rear or inner end is made of considerable height in order to strengthen and brace the frame at the point of support, and to permit the use of a long pivot to prevent sagging under the weight of the hose and rack. The rear portion 13 of the rack is provided with an extended boss 14 having openings at its upper and lower ends for the passage of a bolt 15, one or both ends of which may be threaded for the reception of nuts 16. Under some circumstances the vertical bolt may constitute the pivot on which the hose rack swings, but in carrying out the invention provision is made for supporting the rack on brackets of different shape and size. The upper and lower faces of the portion 13 of the rack are provided with bosses 17, and these bosses, which are preferably rectangular in contour, are arranged to fit within corresponding recesses formed in pivot plates 19, the rear ends of said plates having openings 20 for the passage of the stand pipe $x$, as shown, for instance, in Fig. 1, the stand pipe, or a branch thereof, forming the pivot around which the bracket members 19 and the hose rack may swing during the removal of the hose from the rack.

In some cases it may be desired to provide a wall bracket, such, for instance, as the bracket 19', shown in Fig. 4, said bracket comprising a base member for securement to the wall, and arms that are provided with openings for the passage of the bolt 15, the latter in this case forming a pivot on which the rack may swing. In such cases the lugs 17 are idle, but do not detract materially from the appearance of the rack, and said racks may be made in large quantities without regard to the particular type of bracket on which they are to be supported.

To the vertical flange of the arm 11 is secured a bar 23 that is provided with a large number of elongated openings 24, through which pass the end portions of hose supporting pins 25. These pins are preferably of metal, and one end is bent at a right angle to the length of the pin, and is then provided with a head 26 which plays in a space between the upper edge of the bar 23 and the lower face of the horizontal flange of the arm 11, the space, however, being too narrow to permit the withdrawal of any of the pins through the openings 24. As the openings 24 are elongated, they permit the free swinging of the pins in both vertical and horizontal planes, and the pins have practically universal movement so that the hose supported thereby may be readily freed when necessary. The free ends of the pins are arranged to rest within a groove formed in the opposite arm 12, and the walls of said groove may be formed integral with the casting as shown in Fig. 4, or a separate channel bar 29 may be employed, the groove 30 of such bar receiving the ends of the pins. In the construction shown in Figs. 2 and 3, the channel bar is provided with vertically extended lugs 31 that are arranged for the reception of screws 32 by which the bar may be firmly locked to the arm 12.

Under normal conditions the pins 25 are arranged to extend transversely between the arms 11 and 12, and at a right angle to both arms, the free ends of the pins resting on the lower wall of the groove 30, and being supported thereby until on pulling the hose, the pins are swung on their axes, and the ends of said pins fall by gravity from the inner edge of the support. Near the outer end of the groove 30, the lower wall is provided with a slight notch or depression 33 to receive the end of the outermost of the hose supporting pins forming an impositive lock which will require a slight pull on the hose to release it, thus preventing accidental displacement of the hose.

In practice, the hose is looped over the several pins in the manner shown in Fig. 1, and the end of the hose adjacent to the nozzle is carried up over the outer side of the outermost pin, and the nozzle is then laid on top of the row of pins, being held from lateral disment by the arms 11 and 12, while the hose will ordinarily prevent the escape of the first pin from the supporting groove.

In case of fire, the operator grasps the nozzle, and by pulling on the hose the pins are moved outward in successive order, swinging on their axes, and as each pin drops from the support, it forms an inclined way on which the hose descends by gravity, and the hose in moving down will thrust the pin sidewise, or in the direction of the arm 11, so that said pins will assume the positions shown to the left of Fig. 4.

It is obvious that instead of providing the bar 23 with a series of openings 24, an elongated slot 24' may be formed in the bar for the reception of the pins, so that the latter will be free to move in order to accommodate hose of different width.

With a device of this character, hose may be readily removed in case of fire, and the supporting pins are firmly attached, and are always in position when it becomes necessary to replace the hose.

I claim:—

1. A hose rack comprising a pair of arms, one of said arms being provided with a plurality of elongated openings, hose supporting pins having upturned end portions extending through the openings and provided with heads of a diameter greater than the narrowest portions of the openings, the pins being free to turn through a horizontal arc, and the elongated openings permitting the falling of the pins to angular position to free the hose, the second arm forming a loose support for the free ends of said pins.

2. A hose rack having a pair of spaced arms, one of which is provided with a horizontal flange, a bar carried by said arm at a point below the flange and provided with a plurality of elongated openings, hose supporting pins having upturned end portions extending through the openings and provided with heads free to play between the bar and the flange, the second arm forming a loose support for the free ends of the pins, said pins when disengaged from the second arm being free to fall to a position to form inclined planes for the descent of the hose, and being free to revolve through a horizontal arc to a position clear of the hose, substantially as specified.

3. A hose rack having a pair of flaring arms, one of which is provided with a horizontal flange, a bar carried by said arm at a point below the flange and provided with a plurality of spaced elongated openings, hose supporting pins having upturned end portions extending through the openings and held in spaced relation thereby, the end portions of the pins being provided with heads free to play between the bar and the flange, the second arm forming a continuous rigid support for the free ends of the pins and from which such pins are consecutively displaced during the withdrawal of the hose, said second arm having a recess for receiving the outermost pin and forming an impositive lock therefor.

4. A hose rack comprising a pair of arms and a plurality of hose supporting pins, each having an upturned end portion extending loosely through an elongated opening in one of the arms and provided with a head of a diameter greater than the narrowest portion of the opening, the pins being thus free to turn through a horizontal arc, and to fall to angular position to free the hose, the second arm forming a support for the free ends of said pins.

5. A hose rack comprising a frame having hose supporting members, and provided at its rear end with a bolt receiving opening, and with lugs adjacent to said opening for interchangeable connection with fixed or pivoted supporting brackets.

6. The combination with a hose rack having a bolt receiving opening, of a pair of plates forming a supporting bracket for the rack, a bolt extending through said opening and through corresponding openings in the plates, and auxiliary means for interlocking the rack in place.

7. A hose rack having at its rear end a vertically arranged bolt receiving opening and provided with lugs adjacent to said opening, a pair of plates arranged to form a supporting bracket, said plates having recesses for the reception of the lugs, and a bolt extending through said opening and through corresponding openings formed in said plates.

In testimony that I claim the foregoing as my own, I have hereto affixed my signature in the presence of two witnesses.

REUBEN D. WIRT.

Witnesses:
C. R. PARKER,
JOSEPH THOMASSON.